US009057448B2

(12) United States Patent
Lymberopoulos (10) Patent No.: US 9,057,448 B2
(45) Date of Patent: Jun. 16, 2015

(54) INTERNAL RELIEF VALVE FOR A VALVE ACTUATOR

(75) Inventor: David Lymberopoulos, Houston, TX (US)

(73) Assignee: SAFOCO, Inc., Houston, TX (US)

( * ) Notice: Subject to any disclaimer, the term of this patent is extended or adjusted under 35 U.S.C. 154(b) by 391 days.

(21) Appl. No.: 12/854,670

(22) Filed: Aug. 11, 2010

(65) Prior Publication Data

US 2011/0036415 A1    Feb. 17, 2011

Related U.S. Application Data

(60) Provisional application No. 61/233,023, filed on Aug. 11, 2009.

(51) Int. Cl.
| | |
|---|---|
| *F16K 31/122* | (2006.01) |
| *F16K 17/06* | (2006.01) |
| *F15B 15/20* | (2006.01) |

(52) U.S. Cl.
CPC ............. *F16K 17/06* (2013.01); *F15B 15/204* (2013.01); *F16K 31/122* (2013.01)

(58) Field of Classification Search
CPC .... F15B 15/149; F15B 15/204; F15B 91/422; F16J 1/09; F16J 91/422; F16K 17/06; F16K 31/122
USPC ......... 251/326, 327, 328, 329, 300, 301, 302, 251/303, 62–63.6; 92/172, 183, 184, 185, 92/181 P; 91/422, 440
See application file for complete search history.

(56) References Cited

U.S. PATENT DOCUMENTS

| | | | | | |
|---|---|---|---|---|---|
| 3,339,568 | A | * | 9/1967 | Kerensky | 415/39 |
| 3,366,066 | A | * | 1/1968 | Levey | 417/390 |
| 3,688,644 | A | * | 9/1972 | Cusveller | 91/420 |
| 4,461,449 | A | | 7/1984 | Turner | |
| 4,509,409 | A | * | 4/1985 | Reeves | 92/80 |
| 4,667,570 | A | | 5/1987 | Jensen, Jr. et al. | |
| 4,721,289 | A | * | 1/1988 | Hennells | 267/64.28 |
| 4,934,652 | A | * | 6/1990 | Golden | 251/63.6 |
| 5,275,086 | A | | 1/1994 | Stallings, Jr. | |
| 5,884,895 | A | * | 3/1999 | Wolz et al. | 251/54 |
| 6,089,142 | A | * | 7/2000 | Adrian et al. | 92/181 P |
| 6,089,931 | A | * | 7/2000 | Gorokawa | 440/61 R |
| 7,168,360 | B2 | * | 1/2007 | Massaccesi et al. | 92/181 P |

* cited by examiner

*Primary Examiner* — William McCalister
(74) *Attorney, Agent, or Firm* — Patterson & Sheridan, LLP (57) ABSTRACT

A method and apparatus for a pressure control system for an actuator is provided. In one embodiment, the pressure control system may include a housing defining an upper chamber and a lower chamber, and a piston disposed between the upper and lower chambers. A valve may be coupled to the piston that is operable to control fluid communication between the upper chamber and the lower chamber. In one embodiment, a method of controlling over-pressurization of an actuator includes supplying a fluid pressure to a first chamber of an actuator having a piston and actuating the piston using the fluid pressure. The method may further include relieving the fluid pressure from the first chamber through a valve that is coupled to the piston when the fluid pressure exceeds a predetermined maximum pressure.

22 Claims, 3 Drawing Sheets

INTERNAL RELIEF VALVE FOR A VALVE ACTUATOR

CROSS-REFERENCE TO RELATED APPLICATIONS

This application claims benefit of U.S. Provisional Patent Application Ser. No. 61/233,023, filed Aug. 11, 2009, which is herein incorporated by reference in its entirety.

BACKGROUND OF THE INVENTION

1. Field of the Invention

Embodiments of the invention relate to a pressure relief valve system. Embodiments of the invention relate to an internal pressure relief valve for a valve actuator. Embodiments of the invention relate to an internal pressure relieving hydraulic actuator for use with a valve, such as a gate valve.

2. Description of the Related Art

Various designs of actuators exist that operate to open and close valves in a variety of uses. The petroleum industry, for example, utilizes these actuators to operate gate valves. There are numerous types of gate valves, including direct acting gate valve and reverse acting gate valves. A gate valve may generally comprise a valve body having a central axis aligned with inlet and outlet passages, and a space between the inlet and outlet passages in which a slide, or gate, may be moved perpendicular to the central axis to open and close the valve and thus selectively block fluid flow through tubing. Positioning gate valves along tubing at various locations provides the ability to control and direct the flow of fluids through the tubing.

One type of actuator that is used to open and close a gate valve includes a dual action hydraulic actuator, which is typically mounted on top of the gate valve. This type of actuator has a piston that can be pressurized on a first side to impart an axial force in a first direction and can be pressurized on an opposite side to impart an axial force in an opposite direction. This type of actuator is therefore referred to as a dual action or "double acting" hydraulic actuator. A shaft may be connected to the actuator piston and used to impart the axial force to the gate valve. The shaft that may be connected to a valve stem extending from the valve body of a gate valve, and the valve stem is in turn connected to a gate located within the valve body. The shaft is used to impart axial movement to the valve stem to move the gate between an open position and a closed position.

In operation, when it is desired to open or close the gate valve (depending on the type of valve), a hydraulic fluid may be supplied to a first side of the actuator piston to impart an axial force, such as a downward or push force, to the valve stem of the gate valve via the actuator shaft. When it is desired to close or open the gate valve (depending on the type of valve), the hydraulic fluid may be supplied to the opposite side of the actuator piston to impart an opposite axial force, such as an upward or pull force, to the valve stem of the gate valve via the actuator shaft. The gate is generally connected to the end of the valve stem so that the downward and upward travel of the valve stem will situate the gate in the open and closed positions, respectively.

The use of a hydraulic actuator with a gate valve provides many benefits, but also encounters a few problems. One problem arises when an excessive amount of pressure is inadvertently supplied to the piston to ensure that the gate valve is fully open or closed. This excessive amount of pressure imparts an excessive force to the actuator shaft and thus the valve stem, which can cause damage to either member, as well as the gate and valve body. For example, the valve stem includes an outer shoulder that is configured to engage an inner shoulder of the valve body when the gate valve is in a closed position. This shoulder engagement provides a metal-to-metal seal between the valve stem and the valve body when the gate valve is in the closed position. This shoulder engagement may also prevent removal of the valve stem from the valve body. Continued pressurization of the actuator piston after engagement may cause excessive compressive forces in the metal-to-metal seal, thereby damaging the seal, and/or may actually shear the valve stem through the shoulder of the valve body, thereby damaging both the valve stem and body.

Pressure relief valves have been developed for relieving excessive pressures applied to the types of actuators described above. These pressure relief valves, however, are typically mounted external to the actuator, which make the actuators bulky, awkward, and difficult to use in compact spaces. Further, these exposed pressure relief valves are susceptible to being broken off of the actuator and to being tampered with. Further still, because of the many fluid lines required when external pressure relief valves are connected to an actuator, the relief valve is more susceptible to mechanical failure due to the mounting of the actuator, the rough conditions of usage, and the limited space where these actuators may be installed.

Therefore, there is a need for an improved pressure relief system for use with an actuator for a valve.

SUMMARY OF THE INVENTION

Embodiments of the invention relate to a pressure control system for an actuator and methods of use. In one embodiment, a pressure control system may include a housing defining an upper chamber and a lower chamber. A piston may be disposed in the housing and operable between the upper and lower chambers. The system may further include a valve disposed in the housing that is operable to control fluid communication between the upper chamber and the lower chamber. In one embodiment, the valve may be coupled to the piston.

In one embodiment, a pressure control system may include an actuator having a housing, a first chamber, and a piston. The piston may be movably disposed in the housing. A relief valve may be coupled to the piston and may be operable to release pressure from the first chamber. The system may further include a valve coupled to the actuator.

In one embodiment, a method of controlling over-pressurization of an actuator is provided. The method may include supplying a fluid pressure to a first chamber of an actuator having a piston and actuating the piston using the fluid pressure. The method may further include relieving the fluid pressure from the first chamber through a valve that is coupled to the piston when the fluid pressure exceeds a predetermined maximum pressure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to an internal pressure relief valve for a valve actuator. As set forth herein, embodiments of the invention will be described as they relate to a hydraulically operated gate valve actuator. It is to be noted, however, that aspects of the invention are not limited to use with a hydraulic actuator, but are applicable for use with other types of actuators, such as a pneumatically operated actuator. It is to be further noted, however, that aspects of the invention are not limited to use with gate valves, but are applicable for use with other types of valves. It is to be further noted still, however, that aspects of the invention are not limited to use with valve actuators, but are applicable for use with other types of systems that may require actuator operation. To better understand the novelty of the apparatus of the invention and the methods of use thereof, reference is hereafter made to the accompanying drawings.

Figure 1:
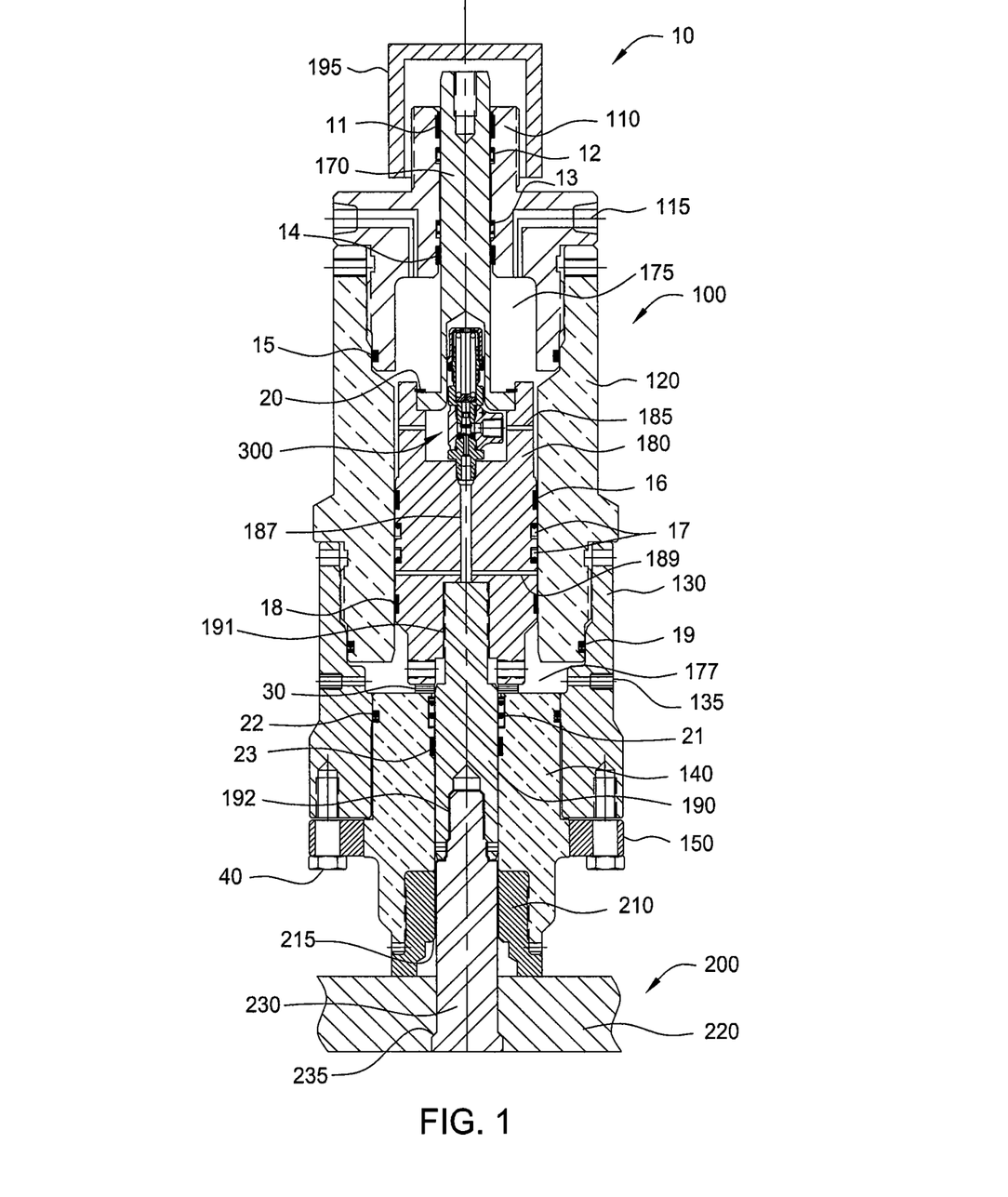
FIG. 1 is a cross sectional view of a valve system in an open position, according to one embodiment of the invention.

FIG. 1 illustrates a cross sectional view of a valve system 10. The valve system 10 includes an actuator 100 that is coupled to a valve 200 and includes a pressure control system, such as a pressure relief valve 300. The actuator 100 is operable using fluid pressure to actuate the valve 200 into an open position and a closed position. The actuator 100 may include a first support member, such as a top plug 110, an upper housing 120, a lower housing 130, a second support member, such as a bonnet adapter 140, and a connection member 150. The actuator 100 may further include a top shaft 170 (such as a first shaft), a piston 180, and a bottom or second shaft, such as a stem adapter 190. The valve 200 may include a bonnet 210, a housing 220, a stem 230, and a gate 240.

The actuator 100 is operable to impart an axial force to the stem 230 of the valve 200 to open and close the valve 200. The axial force may include an upward or pull force and/or a downward or push force depending on the orientation of the actuator 100 and the valve 200. In one embodiment, the actuator 100 is a double acting hydraulic actuator.

The top plug 110 may include a cylindrical body having a bore disposed through the body. The upper end of the body may include threads on its outer diameter for connection with a component, such as a lock open cap 195. The middle portion of the body may include an outer diameter that is greater than the outer diameters of the upper and lower ends, thereby forming a shoulder. The lower end of the body may include threads on its outer diameter for connection with the upper housing 120. The lower end of the body may also include an inner diameter in which the upper end of the piston 180 may be disposed during actuation of the piston 180. In one embodiment, the top plug 110 may be threadedly connected to the upper housing 120, such that the shoulder of the top plug abuts the top end of the upper housing 120. Set screws may be provided to secure the connection between the top plug 110 and the upper housing 120. One or more seals 15 may also be provided to seal the connection between the top plug 110 and the upper housing 120.

The upper housing 120 may include a cylindrical body having a bore disposed through the body. The upper end of the body may include threads on its inner diameter for connection with the top plug 110 as recited above. The middle portion of the body may include an outer diameter that is greater than the outer diameters of the upper and lower ends, thereby forming a shoulder. The lower end of the body may include threads on its outer diameter for connection with the lower housing 130. In one embodiment, the upper housing 120 may be threadedly connected to the lower housing 130, such that the shoulder of the upper housing abuts the top end of the lower housing 130. Set screws may be provided to secure the connection between the upper housing 120 and the lower housing 130. One or more seals 19 may also be provided to seal the connection between the upper housing 120 and the lower housing 130.

The lower housing 130 may include a cylindrical body having a bore disposed through the body. The upper end of the body may include threads on its inner diameter for connection with the upper housing 120 as recited above. The bottom end of the body may include one or more threaded bores to facilitate connection of the lower housing 130 with the bonnet adapter 140 via the connection member 150. The connection member 150 may include a cylindrical body that is connected to the outer diameter of the bonnet adapter 140. The connection member 150 may include one or more openings concentrically disposed through the body of the connection member, which correspond to one or more threaded bores of the lower housing 130. One or more bolts 40 may be disposed through the openings of the connection member 150 and threaded into the bores of the lower housing 130 to connect the bonnet adapter 140 to the lower housing 130. In one embodiment, the lower housing 130 may be connected to the bonnet adapter 140, such that the upper end of the bonnet adapter 140 is disposed in the bore of the lower housing 130. One or more seals 22 may also be provided to seal the connection between the upper end of the bonnet adapter 140 and the bore of the lower housing 130.

The bonnet adapter 140 may include a cylindrical body having a bore disposed through the body. The upper end of the body may be disposed in the bore of the lower housing 130 as recited above. The middle portion of the body may include an outer diameter that is greater than the outer diameters of the upper and lower ends, thereby forming an outer shoulder. The lower end of the body may include an inner diameter greater than the inner diameters of the middle portion and upper end, thereby forming an inner shoulder. The lower end of the body may include threads on its inner diameter for connection with the bonnet 210 of the valve 200. In one embodiment, the connection member 150 may be threaded to the outer diameter of the outer shoulder of the bonnet adapter 140. In one embodiment, the bonnet adapter 140 may be coupled to the lower housing 130, such that the outer shoulder of the bonnet adapter 140 and the top end of the connection member 150 abut the bottom end of the lower housing 130. In one embodiment, the bonnet adapter 140 may be threadedly connected to the bonnet 210 of the valve 200, such that the top end of the bonnet 210 abuts the inner shoulder of the bonnet adapter 140. Set screws may be provided to secure the connection between the bonnet adapter 140 and the bonnet 210.

The top shaft 170 may include a cylindrical body that is movably disposed in the bore of the top plug 110. The body may include a flanged lower end and may also include a bore disposed through a portion of the lower end in which the relief valve 300 may be disposed. The flanged lower end of the body may be configured to connect the top shaft 170 to the piston 180. In one embodiment, the lower end of the top shaft 170 is connected to the upper end of the piston 180 by a connection member 20, such as a snap ring. In one embodiment, the top shaft 170 may extend through the bore of the top plug 110. In one embodiment, the top shaft 170 may extend through the bore of the top plug 110 to provide a visual indication of the position of the actuator 100. The top shaft 170 may be movably disposed through the bore of the top plug 110 by the piston 180. One or more seals 12, 13, and 14 may also be provided to seal the engagement between the top plug 110 and the top shaft 170. One or more assemblies 11 having a rod wiper and/or a wear bearing may also be provided between the top plug 110 and the top shaft 170 engagement to facilitate operation of the actuator 100.

The piston 180 may include a cylindrical body that is movably disposed in the upper housing 120. The upper end of the body may include a first inner diameter in which the flanged lower end of the top shaft 170 may be disposed. The connection member 20 may secure the flanged lower end of the top shaft 170 in the first inner diameter of the piston 180. The upper end of the body may include a second inner diameter that is less than the first inner diameter in which the relief valve 300 may be disposed. The middle portion of the body may include an outer diameter that is greater than the outer diameters of the upper and lower ends and is engaged with the inner diameter of the upper housing 120. The lower end of the body may include a third inner diameter, which forms an inner shoulder, and includes threads for connection with the stem adapter 190. In one embodiment, the lower end of the top shaft 170 is connected to the upper end of the piston 180, such that the relief valve 300 is partially disposed in the lower end of the top shaft 170 and is partially disposed in the upper end of the piston 180. In one embodiment, the piston 180 may be threadedly connected to the stem adapter 190, such that the top end of the stem adapter 190 abuts the inner shoulder of the piston 180. Set screws may be provided to secure the connection between the piston 180 and the stem adapter 190. One or more seals 17 may also be provided to seal the engagement between the piston 180 and the upper housing 120. One or more assemblies 16 and 18 having wear bearings may also be provided between the piston 180 and the upper housing 120 engagement to facilitate operation of the actuator 100.

The stem adapter 190 may include a cylindrical body that is movably disposed in the bore of the bonnet adapter 140. The upper end of the body may include threads on its outer diameter for connection with the piston 180 as recited above. The lower end of the body may include a bore having threads disposed through a portion of the lower end in which the upper end of the stem 230 may be disposed. In one embodiment, the stem adapter 190 may be threadedly connected to the upper end of the stem 230, such that the top end of the stem 230 abuts an inner shoulder of the stem adapter 190. Set screws may be provided to secure the connection between the stem adapter 190 and the stem 230. In one embodiment, the stem adapter 190 may partially extend through and engage the bore of the bonnet adapter 140. The stem adapter 190 may be movably disposed through the bore of the bonnet adapter 140 by the piston 180. One or more seals 21 may also be provided to seal the engagement between the steam adapter 190 and the bonnet adapter 140. One or more assemblies 23 having a wear bearing may also be provided between the steam adapter 190 and the bonnet adapter 140 engagement to facilitate operation of the actuator 100.

In one embodiment, the actuator 100 may include one or more spacers 30, such as drift washers. The spacers 30 may be used to determine the downward stop drift by controlling the length of the stroke of the piston 180 and stem adapter 190 toward the bonnet adapter 140.

In one embodiment, the actuator 100 may optionally include a removable lock open cap 195. The lock open cap 195 may be used to lock the valve 200 in the open position, regardless of whether the actuator 100 is pressurized or not. The lock open cap 195 may include a threaded inner diameter configured to engage the threaded outer diameter of the top plug 110. After the lock open cap 195 is connected to the top plug 100, it is operable to prevent movement of the top shaft 170 and thus the piston 180 from moving the valve 200 into the closed position.

The actuator 100 includes an upper chamber 175 (such as a second chamber) and a lower chamber 177 (such as a first chamber) disposed above and below the piston 180, respectively. The one or more seals 17 are provided between the upper chamber 175 and the lower chamber 177. The upper chamber 175 may be formed by the sealed engagement between the top shaft 170, the top plug 110, the upper housing 120, and the piston 180. The lower chamber 177 may be formed by the sealed engagement between the piston 180, the upper housing 120, the lower housing 130, the bonnet adapter 140, and the steam adapter 190. A fluid may be supplied to and returned from the upper chamber 175 through one or more ports 115 disposed through the body of the top plug 110. The port 115 provides fluid communication between the interior and the exterior of the actuator 100 to actuate the piston 180 in a downward direction. A fluid may be supplied to and returned from the lower chamber 177 through one or more ports 135 disposed through the body of the lower housing 130. The port 115 provides fluid communication between the interior and the exterior of the actuator 100 to actuate the piston 180 in an upward direction.

The relief valve 300 may be configured to control fluid communication between the lower chamber 177 and the upper chamber 175 through the body of the piston 180. In one embodiment, the piston 180 may include a first port 185 disposed through the body of the piston 180 to provide a fluid communication path between an interior portion of the piston 180 in which the relief valve 300 is disposed and the upper chamber 175 surrounding the upper end of the piston 180. In one embodiment, the piston 180 may include a second port 187 disposed through the body of the piston 180 to provide a fluid communication path between the interior portion of the piston 180 in which the relief valve 300 is disposed and the lower chamber 177 surrounding the lower end of the piston 180. The piston 180 may include a third port 189 disposed through the body of the piston 180 that intersects the second port 187 and provides an additional fluid communication path to the lower chamber 177.

In one embodiment, the relief valve 300 is threadedly connected to and sealingly engaged with the piston 180 in a manner that the second port 187 is in direct fluid communication with a first opening of the relief valve 300. The first port 185 is in fluid communication with a second opening of the relief valve 300. A valve member is positioned within the relief valve 300 that opens and closes fluid communication between the first and second openings of the relief valve 300. In one embodiment, the valve member is movable using pressure supplied to either the upper chamber 175 and/or the lower chamber 177, when the pressure exceeds a predetermined amount. Fluid communication between the second port 187 and the first port 185 and thus the lower and upper chambers 177 and 175 is therefore established through the relief valve 300.

The relief valve 300 may include any type of valve known to one of ordinary skill that is operable to open and close fluid communication between the lower chamber 177 and the upper chamber 175. In particular, the relief valve 300 is operable to control fluid communication between the first port 185 and the second and third ports 187 and 189. In one embodiment, when the upper chamber 175 or the lower chamber 177 is pressurized to actuate the piston 180, if the pressure in the chamber exceeds a predetermined threshold, the relief valve 300 is operable to relieve the pressure from the chamber by opening fluid communication to the other chamber. The excess pressure may then be exhausted from the actuator 100 through the port 115 or 135. The relief valve 300 is further operable to automatically close fluid communication between the chambers after the excess pressure has been relieved from the particular chamber. The relief valve 300 is configurable to prevent over-pressurization of either chamber 175 and 177, thereby preventing potential damage to the actuator 100 and/or the valve 200 during operation.

FIG. 1 illustrates the valve 200 in an open position. Pressure is supplied to the upper chamber 175 via the ports 115, which acts on the upper side of the piston 180 to actuate the piston 180. The top shaft 110, the piston 180, the relief valve 300, and the stem adapter 190 move in a downward direction relative to the top plug 110, the upper housing 120, the lower housing 130, and the bonnet adapter 140. The piston 180 moves the valve stem 230 (via the steam adapter 190) relative to the bonnet 210 and the valve body 220 to position the valve 200 in the open position. The piston 180 travels within the upper housing 120 until it engages the top end of the bonnet adapter 140 and/or the spacers 30.

As the upper chamber 175 is pressurized to actuate the piston 180, the relief valve 300 prevents fluid communication to the lower chamber 177. In the event that the pressure in the upper chamber 175 exceeds a predetermined threshold, the relief valve 300 is operable to open fluid communication to the lower chamber 177 via the ports 185 and 187 and through the relief valve 300 to relieve any excess pressure supplied to the upper chamber 175. The excess pressure may then be exhausted from the actuator 100 through the port 135. The relief valve 300 may automatically close fluid communication to the lower chamber 177 after the pressure in the upper chamber 175 decreases below the predetermined threshold.

Figure 2:
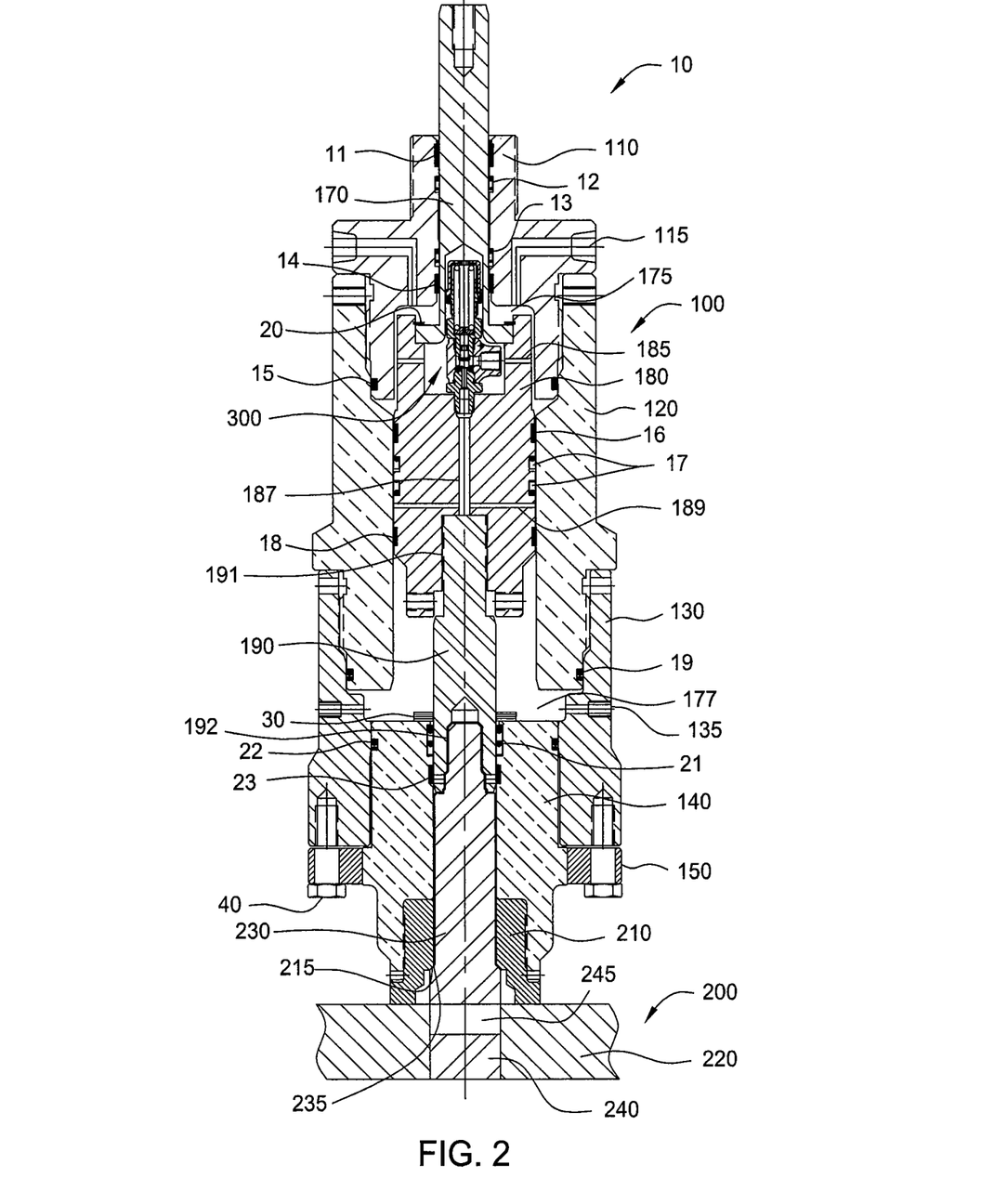
FIG. 2 is a cross sectional view of the valve system in a closed position, according to one embodiment of the invention.

FIG. 2 illustrates the valve 200 in a closed position. Pressure is supplied to the lower chamber 177 via the ports 135, which acts on the lower side of the piston 180 to actuate the piston 180. The top shaft 110, the piston 180, the relief valve 300, and the stem adapter 190 move in an upward direction relative to the top plug 110, the upper housing 120, the lower housing 130, and the bonnet adapter 140. The piston 180 moves the valve stem 230 (via the steam adapter 190) relative to the bonnet 210 and the valve body 220 to position the valve 200 in the open position. In particular, the piston 180 moves an opening 245 of the gate 240 (via the steam adapter 190 and the stem 230) from communication with the inlets and outlets of the valve body 220. The piston 180 travels within the upper housing 120 until a shoulder 235 on the stem 230 engages a shoulder 215 on the bonnet 210.

As the lower chamber 177 is pressurized to actuate the piston 180, the relief valve 300 prevents fluid communication to the upper chamber 175. In the event that the pressure in the lower chamber 177 exceeds a predetermined threshold, the relief valve 300 is operable to open fluid communication to the upper chamber 175 via the ports 189, 187, and 185 and through the relief valve 300 to relieve any excess pressure supplied to the lower chamber 177. The excess pressure may then be exhausted from the actuator 100 through the port 115. The relief valve 300 may automatically close fluid communication to the upper chamber 175 after the pressure in the lower chamber 177 decreases below the predetermined threshold. The pressure relief may prevent damage to the shoulder engagement at 235 and 215 between the stem 230 and the bonnet 210 by over pressurization of the lower chamber 177. In one embodiment, the relief valve 300 is set to open fluid communication from the lower chamber 177 to the upper chamber 175 prior to the shearing of the stem 230 and/or the bonnet 210. The force necessary to open the relief valve 300 may be set to below the force necessary to shear the stem 230 and/or the bonnet 210. The pressure relief may prevent damage to the threaded engagement at 191 between the stem adapter 190 and the piston 180 by over pressurization of the lower chamber 177. In one embodiment, the relief valve 300 is set to open fluid communication from the lower chamber 177 to the upper chamber 175 prior to the shearing of the threads on the stem adapter 190 and/or piston 180. The force necessary to open the relief valve 300 may be set to below the force necessary to shear the threaded engagement at 191. The pressure relief may prevent damage to the threaded engagement at 192 between the stem adapter 190 and the stem 230 by over pressurization of the lower chamber 177. In one embodiment, the relief valve 300 is set to open fluid communication from the lower chamber 177 to the upper chamber 175 prior to the shearing of the threads on the stem adapter 190 and/or stem 230. The force necessary to open the relief valve 300 may be set to below the force necessary to shear the threaded engagement at 192.

Figure 3:
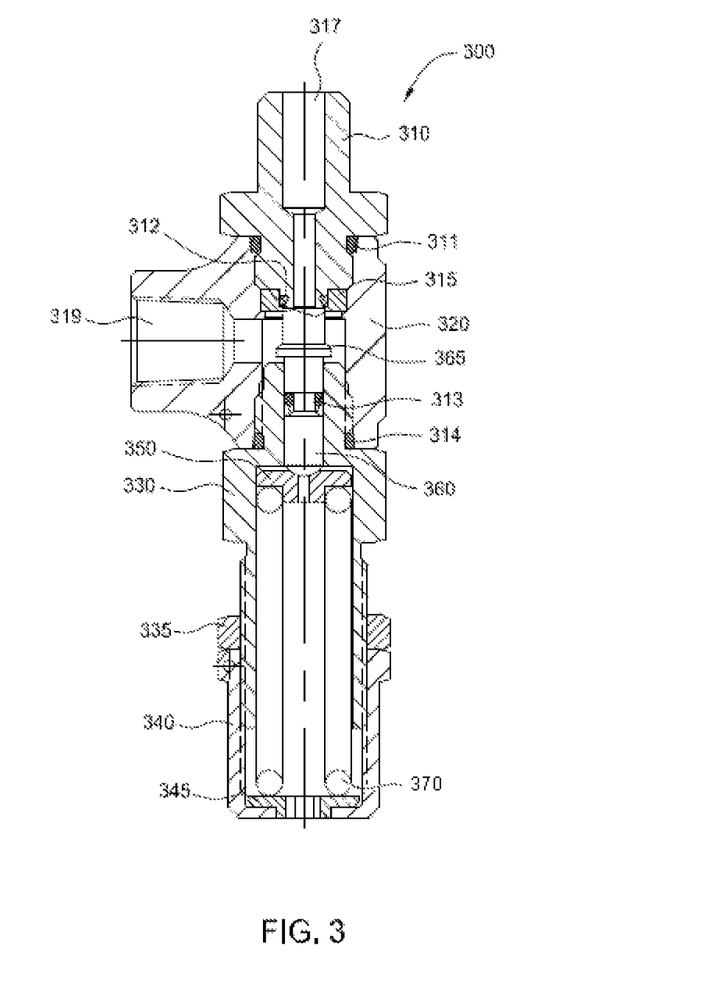
FIG. 3 is a cross sectional view of a pressure relief valve, according to one embodiment of the invention.

As stated above, any type of pressure relief valve may be used with the embodiments of the invention described herein. FIG. 3 illustrates one embodiment of a pressure relief valve 300. The pressure relief valve 300 may include a connection member 310, an upper housing 320, a lower housing 330, an adjustment member 340, a sealing member 360, and a biasing member 370, such as a spring. The connection member 310 may include a cylindrical body having a bore 317 disposed through the body. The upper end of the body may include threads on its outer diameter for connection to the piston 180. The middle portion of the body may include an outer diameter that is greater than the outer diameters of the upper and lower ends, thereby forming a shoulder. The lower end of the body may be connected to the upper housing 320. In one embodiment, the lower end of the connection member 310 may be threadedly connected to the upper housing 320, such that the top end of the upper housing 320 abuts the bottom end of the shoulder of the connection member 310. One or more seals 311 and 312 and one or more spacers 315 may be provided between the connection member 310 and the upper housing 320 interface. The upper housing 320 may include a cylindrical body having a bore 319 that extends from the top end to the bottom end of the body and out through a side of the body. The lower housing 330 may include a cylindrical body having a bore disposed through the body. The upper end of the body may include an outer diameter having threads for connection to the upper housing 320. The middle portion of the body may include an outer diameter that is greater than the outer diameters of the upper and lower ends, thereby forming a shoulder. The lower end of the body may include threads on its outer diameter for connection with the adjustment member 340. In one embodiment, the upper end of the lower housing 330 may be threadedly connected to the upper housing 320, such that the bottom end of the upper housing 320 abuts the top end of the shoulder of the lower housing 330. One or more seals 314 may be provided between the upper housing 320 and the lower housing 330 interface.

The adjustment member 340 may be connected to the lower housing 330 and used to secure the biasing member 370 therein. An upper gage 350 and a lower gage 345 may be positioned at opposite ends of the biasing member 370 to support the biasing member 370. A stop member 335 may also be connected to the outer diameter of the lower housing 330 to limit amount of threaded engagement between the adjustment member 340 and the lower housing 330. In one embodiment, the stop member 335 may be a seal for securing the relief valve 300 in the lower end of the top shaft 170. The sealing member 360 may include a cylindrical body having a shoulder 365 that is movably disposed in the upper housing 320 and the lower housing 330. The upper end of the sealing member 360 may be biased into a sealed engagement with the connection member 310 by the biasing member 370, thereby preventing fluid communication between the bore 317 of the connection member 310 and the bore 319 of the upper housing 320. The lower end of the sealing member 360 may be disposed in the lower housing 330, such that the lower end abuts the upper gage 350, which is supported by the biasing member 370. One or more seals 313 may be provided between the sealing member 360 and the lower housing 330. The shoulder 365 may limit the amount of travel of the sealing member 360 into the bore of the lower housing 330.

In operation, a pressure may be supplied against the end of the sealing member 360 through the bore 317 that is sufficient to overcome the closure force provided by the biasing member 370. For example, the pressure supplied to the lower chamber 177 may be communicated to the end of the sealing member 360 via the ports 187 and 189. The pressure may move the sealing member 360 out of its sealed engagement with the connection member 310, thereby opening fluid communication between the bore 317 and the bore 319 of the upper housing 320 and thus opening fluid communication between the ports 187 and 189 and the port 185. The pressure may be then be communicated to the upper chamber 175 through the port 185 and exhausted through the port 115.

The biasing member 370 is operable to move the sealing member 360 back into its sealed engagement with the connection member 310 when the pressure is reduced to a force below the closure force of the biasing member 370. The biasing member 370 is compressed between the adjustment member 340 and the lower housing 330. The amount of compression of the biasing member 370 is controlled by the size of the housing formed between the adjustment member 340 and the lower housing 330 in which the biasing member 370 is disposed. The closure force of the biasing member 370 is therefore controllable by adjusting the relative connection of the adjustment member 340 to the lower housing 330. The closure force of the biasing member 370 may be adjusted to a maximum pressure that is to be supplied to the lower chamber 177. When the pressure in the lower chamber 177 reaches the maximum pressure, the relief valve 300 will operate to relieve any pressure in excess of the maximum pressure from the lower chamber 177 to the upper chamber 175 and exhaust the excess pressure from the actuator 100 via the port 115. The relief valve 300 will automatically close fluid communication to the upper chamber 175 when the pressure drops below the maximum pressure. In one embodiment, the maximum pressure may be set below the force necessary to shear the shoulder engagement between the stem 230 and the bonnet 210, the threaded engagement at 191 between the stem adapter 190 and the piston 180, and/or the threaded engagement at 192 between the stem adapter 190 and the stem 230. In this manner, the relief valve 300 is operable to control fluid communication between the lower chamber 177 and the upper chamber 175 of the actuator 100.

While the foregoing is directed to embodiments of the present invention, other and further embodiments of the invention may be devised without departing from the basic scope thereof, and the scope thereof is determined by the claims that follow.

The invention claimed is:

1. A valve system, comprising:
an actuator having a first shaft, an actuator housing, a piston disposed in the actuator housing, a first chamber disposed on one side of the piston, and a second chamber disposed on an opposite side of the piston, the piston movable by pressurized fluid supplied into the first chamber and the second chamber;
a relief valve coupled to the piston, at least partially disposed in the first shaft, and operable to release pressurized fluid from the first chamber into the second chamber through one or more ports formed in the piston when pressure in the first chamber exceeds a predetermined amount, wherein the relief valve includes a valve housing, a biasing member disposed in the valve housing, and an adjustment member coupled to the valve housing, wherein the adjustment member is movable relative to the valve housing to compress the biasing member and thereby adjust the predetermined amount of pressure at which the relief valve is operable to release the pressurized fluid from the first chamber; and
a gate valve coupled to the actuator.

2. The system of claim 1, wherein the piston includes a first port that provides fluid communication between the relief valve and the first chamber, wherein the piston includes a second port that provides fluid communication between the relief valve and the second chamber.

3. The system of claim 1, wherein the relief valve further comprises a sealing member that is disposed within the valve housing and that is biased by the biasing member to close fluid communication between the first chamber and the second chamber, and wherein the sealing member is movable against the biasing member to open fluid communication between the first chamber and the second chamber when pressure in the first chamber exceeds the predetermined amount.

4. The system of claim 3, wherein the piston and the relief valve are movable in a first direction using pressurized fluid supplied to the first chamber.

5. The system of claim 4, wherein the piston and the relief valve are movable in a second direction using pressurized fluid supplied to the second chamber.

6. The system of claim 1, wherein the first shaft is coupled to the piston and at least partially extending through the actuator housing.

7. The system of claim 6, further comprising a second shaft coupled to the piston and at least partially extending through the actuator housing, wherein the second shaft is coupled to the gate valve.

8. The system of claim 1, wherein the piston is movable in a first direction using pressurized fluid supplied from an exterior of the actuator into the first chamber, wherein the relief valve is configured to close fluid communication through the one or more ports in the piston as the piston moves in the first direction, and wherein when further movement of the piston is stopped by a shoulder engagement the relief valve is configured to open fluid communication through the one or more ports when pressure in the first chamber exceeds the predetermined amount.

9. A valve system, comprising:
an actuator having a shaft, an actuator housing, an upper chamber, a lower chamber, and a piston disposed in the actuator housing and having one or more ports providing fluid communication between the upper chamber and the lower chamber, the piston movable in a first direction using pressurized fluid supplied from an exterior of the actuator into the upper chamber, the piston movable in a second, opposite direction using pressurized fluid supplied from the exterior of the actuator into the lower chamber;

a relief valve, at least partially disposed in the shaft, configured to close fluid communication through the one or more ports as the piston moves in the first direction and the second direction, wherein when the piston is prevented from further movement the relief valve is configured to open fluid communication through the one or more ports when pressure in the upper chamber or the lower chamber exceeds a predetermined amount, and wherein the relief valve includes a valve housing, a biasing member disposed in the valve housing, and an adjustment member coupled to the valve housing, wherein the adjustment member is movable relative to the valve housing to compress the biasing member and thereby adjust the predetermined amount of pressure at which the relief valve is configured to open fluid communication through the one or more ports; and a valve movable into an open position and a closed position by the piston.

10. The system of claim 9, wherein the shaft is coupled to the piston and at least partially extending through the actuator housing, wherein the relief valve is disposed between the piston and the shaft.

11. The system of claim 10, further comprising an adapter coupled to the piston and at least partially extending through the actuator housing, wherein the adapter is coupled to the valve.

12. The system of claim 11, wherein the valve comprises a gate valve.

13. The system of claim 12, wherein the valve comprises a valve stem coupled between the adapter and the gate valve, the valve stem having a shoulder moveable into engagement with a shoulder on a bonnet of the valve, thereby preventing further movement of the piston in the second, opposite direction.

14. The system of claim 9, wherein piston is moveable in the first direction until the piston engages a top end of a bonnet adapter of the actuator, thereby preventing further movement of the piston in the first direction.

15. The system of claim 1, wherein when the piston is prevented from further movement the relief valve is configured to open fluid communication through the one or more ports when pressure in the first chamber exceeds the predetermined amount.

16. The system of claim 1, further comprising a valve stem coupled between the piston and a gate of the gate valve, the valve stem having a shoulder moveable into engagement with a shoulder on a bonnet of the gate valve, thereby preventing further movement of the piston in one direction.

17. The system of claim 16, wherein piston is moveable in an opposite direction until the piston engages a top end of a bonnet adapter of the actuator, thereby preventing further movement of the piston in the opposite direction.

18. The system of claim 8, wherein the shoulder engagement comprises a shoulder on a valve stem that engages a shoulder on a bonnet of the gate valve, the valve stem coupled between the piston and a gate of the gate valve.

19. The system of claim 8, wherein the shoulder engagement comprises one end of the piston engaging a top end of a bonnet adapter of the actuator.

20. The system of claim 1, wherein the valve housing is at least partially disposed in the upper end of the piston and at least partially disposed in a lower end of the first shaft.

21. The system of claim 9, wherein the relief valve further comprises a sealing member that is disposed within the valve housing and that is biased by the biasing member to close fluid communication between the upper chamber and the lower chamber, and wherein the sealing member is movable against the biasing member to open fluid communication between the upper chamber and the lower chamber through the one or more ports when pressure in the upper chamber or the lower chamber exceeds the predetermined amount.

22. The system of claim 9, wherein the relief valve further comprises a connection member that couples the valve housing to the piston.

* * * * *

UNITED STATES PATENT AND TRADEMARK OFFICE
CERTIFICATE OF CORRECTION

PATENT NO. : 9,057,448 B2  
APPLICATION NO. : 12/854670  
DATED : June 16, 2015  
INVENTOR(S) : Lymberopoulos Page 1 of 1

It is certified that error appears in the above-identified patent and that said Letters Patent is hereby corrected as shown below:

In the specification

Column 5, Line 54, please delete "steam" and insert --stem-- therefor;

Column 5, Line 56, please delete "steam" and insert --stem-- therefor;

Column 6, Line 4, please delete "100" and insert --110-- therefor;

Column 6, Line 17, please delete "steam" and insert --stem-- therefor;

Column 7, Line 15, please delete "110" and insert --170-- therefor;

Column 7, Line 19, please delete "steam" and insert --stem-- therefor;

Column 7, Line 39, please delete "110" and insert --170-- therefor;

Column 7, Line 43, please delete "steam" and insert --stem-- therefor;

Column 7, Line 46, please delete "steam" and insert --stem-- therefor.

Signed and Sealed this  
Fifteenth Day of December, 2015

Michelle K. Lee  
*Director of the United States Patent and Trademark Office*